US012512577B1

(12) United States Patent
Wrigley

(10) Patent No.: US 12,512,577 B1
(45) Date of Patent: Dec. 30, 2025

(54) MAGIC TEE WAVEGUIDE STRUCTURE WITH TRIANGULAR IMPEDANCE MATCHING ELEMENT

(71) Applicant: Lockheed Martin Corporation, Bethesda, MD (US)

(72) Inventor: Jason Stewart Wrigley, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 162 days.

(21) Appl. No.: 18/502,582

(22) Filed: Nov. 6, 2023

(51) Int. Cl.
*H01P 5/20* (2006.01)
*H01P 5/04* (2006.01)

(52) U.S. Cl.
CPC . *H01P 5/20* (2013.01); *H01P 5/04* (2013.01)

(58) Field of Classification Search
CPC .................................... H01P 5/20; H01P 5/04
See application file for complete search history.

(56) References Cited

U.S. PATENT DOCUMENTS 12,040,529 B2 * 7/2024 Bru ........................ H01P 11/002
2013/0314172 A1 * 11/2013 Massman .................. H01P 5/20 333/122
2015/0372369 A1 * 12/2015 Tatomir .................... H01P 5/20 333/122

FOREIGN PATENT DOCUMENTS

CN 110783682 A * 2/2020 ................ H01P 5/20

OTHER PUBLICATIONS

Ren, Lingyun et al., "Full-Band Millimeter Wave Waveguide Magic Tees and Power Dividers for Manufacturing Ability," Proceedings of the 51st European Microwave Conference, pp. 229-232, Apr. 4-6, 2022.

Wu, H. C. et al., "A Rigorous Analysis and Experimental Researches of Waveguide Magic Tee at W Band," Progress in Electromagnetics Research, PIER 60, pp. 131-142, 2006.

* cited by examiner

*Primary Examiner* — Andrea Lindgren Baltzell
*Assistant Examiner* — Kimberly E Glenn

(57) ABSTRACT

Provided herein are various enhancements for waveguide structures and magic tee arrangements in radio frequency aperture antenna feed structures. A waveguide structure includes a waveguide cavity coupling colinear ports, a difference port, and a sum port, with the sum port disposed perpendicularly to both the difference port and the colinear ports. The waveguide structure also includes an impendence matching element comprising a triangular body disposed in the waveguide cavity and protruding perpendicularly from a wall of the waveguide cavity between the colinear ports.

20 Claims, 5 Drawing Sheets

MAGIC TEE WAVEGUIDE STRUCTURE WITH TRIANGULAR IMPEDANCE MATCHING ELEMENT

TECHNICAL BACKGROUND

Microwave radio frequency (RF) transmission and receiving systems are employed across a wide range of application areas, including satellite communications, terrestrial telecommunications, wireless data transmission, telemetry, surveillance, remote sensing and control, among other application areas. Often, RF transmit/receive circuitry is employed in concert with various waveguide-based feed components which couple to aperture antenna elements. Aperture antennas are a form of RF antenna used for directed transmission and reception of various RF signals, often employed in direct-radiated arrays or in reflector antenna feed systems. When large quantities of aperture antennas are desired, such as in electronically steered arrays (ESAs), designing and assembling RF waveguide-based feed solutions between RF circuitry and radiative components presents many challenges. These challenges can be especially pronounced when high-density, low-cost, and low-profile arrays are desired.

In addition to passive RF conduits, waveguides can be used to form various structures which can alter or redirect the propagated signals based on frequency or wavelength, polarization, amplitude, phase, and other characteristics. Example waveguide-based components can include orthomode transducers (OMTs), polarizers, filters, couplers, hybrid couplers, magic tees, and the like.

Magic Tees are four-port waveguide RF components used in waveguide feed networks to produce desired signal routing and phase shifting among ports. Based on selected geometries and connections, magic tees can establish impedance matching and isolation among coupled ports. Magic tees typically include a difference port, a sum port, and two collinear ports. For magic tees, when the difference and sum ports are simultaneously matched, then the two collinear ports are 'magically' matched and isolated from each other (according to symmetry and conservation of energy). In other examples, exciting the difference port results in a 180-degree phase shift between split signals, with the sum port at a 0-degree phase shift.

Magic tees can incorporate an internal matching structure to provide impedance matching among the magic tee waveguide junction. In some examples, such as traditional electroformed magic tee elements, this internal matching structure takes the form of a thin and tall cylindrical post with a rotationally symmetric conical or stepped base that is provided internal to the magic tee waveguide cavity. In other examples, a rectangular ridge is provided at the H-plane port, however this leads to a less-robust design and the transitions from ridge to standard rectangular waveguide can drastically increase magic tee footprints. In yet other examples, tuning is achieved using moveable cylindrical rods or screw elements which protrude into the magic tee waveguide cavity. However, these existing magic tee configurations do not lend themselves to additive manufacturing processes, or vertical layered 3D printing techniques. Specifically, the internal matching structures and external walls of traditional magic tec structures do not allow monolithic "single-workpiece" additive manufacturing.

SUMMARY

Provided herein are various enhancements for waveguide structures and magic tec arrangements in RF aperture antenna feed structures. Various enhanced waveguide structures and manufacturing techniques can establish magic tee junction configurations suitable for additive manufacturing or 3D printing as monolithic structures. These enhanced magic tee configurations can be employed in any waveguide-based RF feed network, among other applications. Example frequency ranges can include the X-band or Ka-band, although exact frequency ranges can be selected based on scaling of the geometries of the magic tee elements.

A waveguide structure includes a waveguide cavity coupling colinear ports, a difference port, and a sum port, with the sum port disposed perpendicularly to both the difference port and the colinear ports. The waveguide structure also includes an impendence matching element comprising a triangular body disposed in the waveguide cavity and protruding perpendicularly from a wall of the waveguide cavity between the colinear ports.

In another example, a method includes forming a waveguide structure by at least forming a waveguide cavity coupling colinear ports, a difference port, and a sum port, with the sum port positioned perpendicularly to both the difference port and the colinear ports. The method also includes forming an impendence matching element comprising a triangular body disposed in the waveguide cavity and protruding perpendicularly from a wall of the waveguide cavity between the colinear ports.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
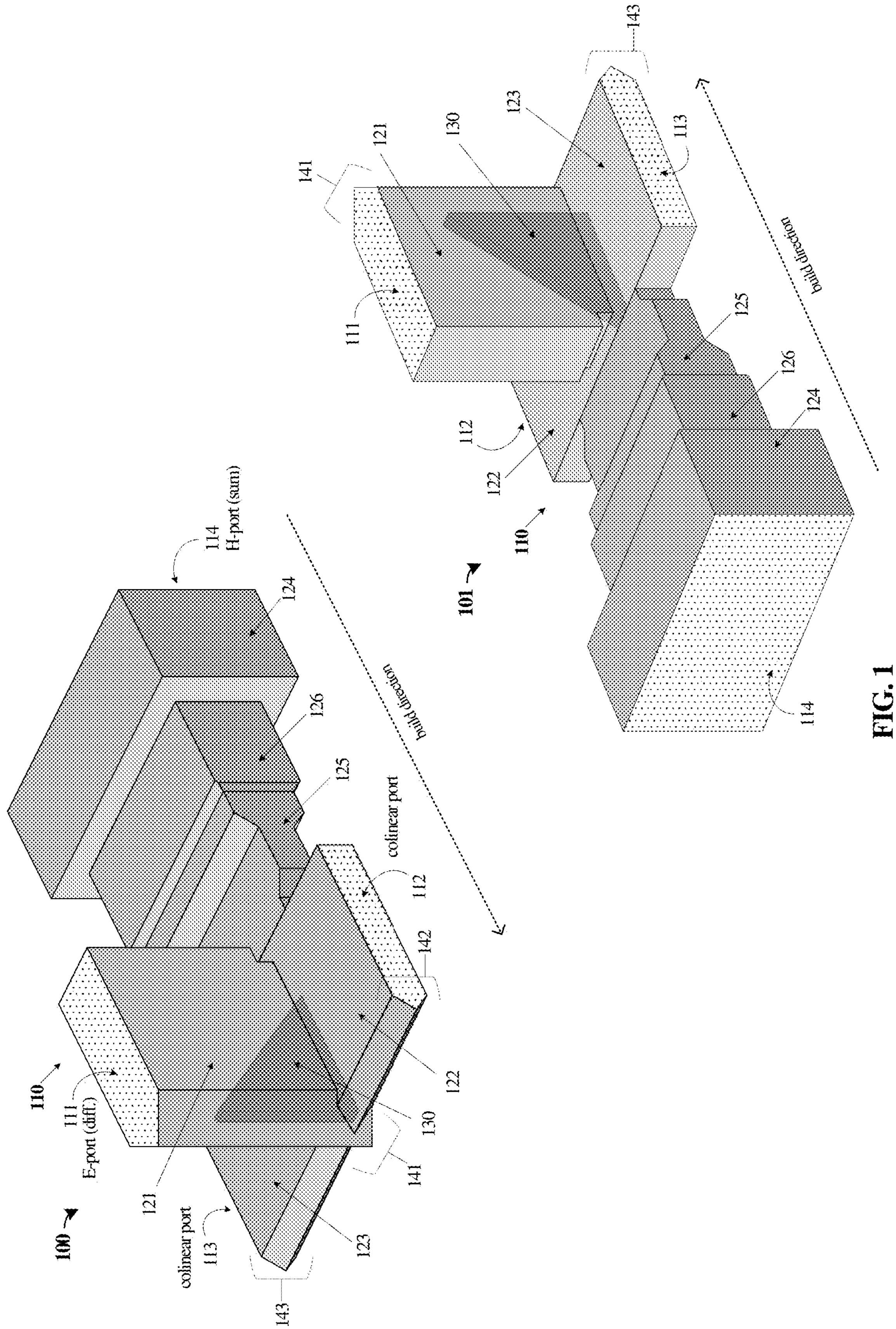
FIG. 1 illustrates a magic tee waveguide structure in an implementation.

Provided herein are various enhanced radio frequency (RF) waveguide structures used to establish magic tee waveguide junction configurations. These enhanced waveguide structures are suitable for various manufacturing techniques including additive manufacturing (AM), also referred to as 3D printing. AM techniques can include various manufacturing processes suitable for metal or metal alloy materials such as Direct Metal Laser Sintering (DMLS), stereolithography (SLA), selective laser sintering (SLS), among others. Other examples include polymer or non-conductive material 3D printing which then have RF-contacting surfaces coated, plated, or deposited with layers of conductive material. Thus, while the specific AM techniques employed can vary, the enhanced waveguide structures discussed herein can provide desired performance over selected frequency ranges.

Magic tee configurations can be employed in waveguide-based RF feed networks, among other applications. Waveguide feed networks can be coupled to antenna apertures, such as horn apertures, to produce desired signal routing and phase shifting among transmit (Tx) and receive (Rx) ports. Magic tee elements can accompany polarizers, couplers or hybrid couplers, filters, recombination elements, and other components. Based on selected geometries and connections, magic tees can establish impedance matching and isolation among various ports, and operate over selected frequency ranges.

Various terms are employed herein to describe RF structures and waveguide elements. The electric plane, or E-plane, is a plane defined by the direction of a transverse electric field in a waveguide. Often, this corresponds to a vertical axis along a waveguide. The magnetic plane, or H-plane, is a plane defined by the direction of the transverse magnetic field in a waveguide. Often, this corresponds to the horizontal axis along a waveguide. Magic tee elements typically include a difference port (E-plane port or E-port), a sum port (H-plane port or H-port), and two collinear ports. For magic tees, when the difference and sum ports are impedance matched, then the two collinear ports are 'magically' matched and isolated from each other (according to symmetry and conservation of energy). In other examples, exciting the E-port results in a 180-degree phase shift between split signals, with the H-port at a 0-degree phase shift, or conversely, exciting the H-port results in a 180-degree phase shift between split signals, with the E-port at a 0-degree phase shift.

Magic tees can incorporate an internal impedance matching structure to provide impedance matching among the magic tee ports. In some examples, such as traditional electroformed magic tee elements, this internal matching structure takes the form of a thin and tall cylindrical rod or post having a rotationally symmetric conical or stepped base that is provided internal to the magic tee waveguide cavity. In other examples, a rectangular ridge is provided at the H-plane port, however this comes with limitations on which specific ports can be driven. In yet other examples, impedance tuning is achieved using moveable cylindrical rods or movable threaded rod elements which protrude into the magic tee waveguide cavity. However, these existing magic tee configurations do not lend themselves to additive manufacturing processes, or vertical layered 3D printing techniques. Specifically, the internal matching structures and external walls of traditional magic tee structures do not allow monolithic "single-workpiece" additive manufacturing. For example, the various rods or posts cannot be printed in a horizontal orientation without support structures added internal to a waveguide cavity which then requires extensive post-processing to remove such support structures. This precludes 3D printing a magic tee structure with an internal impedance matching element in a vertical direction defined by starting at the sum port and working 'upwards' to the difference/colinear ports.

Figure 3:
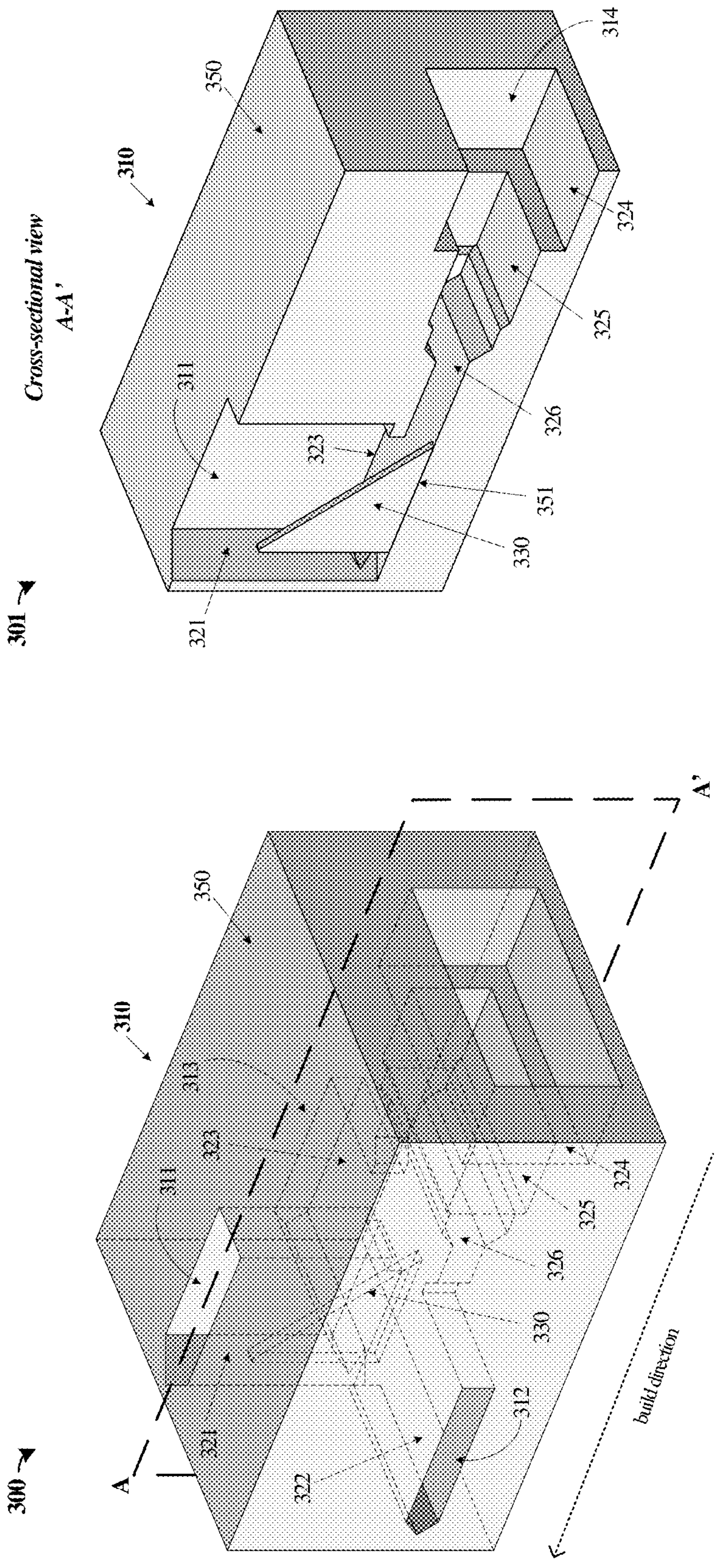
FIG. 3 illustrates a magic tee waveguide structure in an implementation.

Turning now to a first example waveguide structure, FIG. 1 is presented. FIG. 1 includes views 100 and 101 which show isometric views of the waveguide air cavity for a magic tee waveguide structure 110. An air cavity view comprises the volume or space internal to a waveguide or other RF structure, such that the view shows cavities, spaces, channels, conduits, or other features through which RF energy can propagate or resonate. In contrast, manufactured views, such as seen in FIG. 3, various material is provided to form walls or structures around the air cavities, with conductive surfaces typically in contact with the air cavities. Variations on the manufactured implementation can be employed based on application, and thus the air cavity view provides an illustration of the functional or RF-active portions of a waveguide structure.

Turning now to the features illustrated in FIG. 1, view 100 shows a first orientation of waveguide structure 110, and view 101 shows a second orientation of waveguide structure 110. Waveguide structure 110 includes four ports 111-114. Port 111 comprises a difference or E-port, port 114 comprises a sum port or H-port, and ports 112-113 comprise colinear ports. Each port comprises an aperture which can be coupled to further RF elements, such as by flanged connections, connectors, welds, or formed with other integrated RF elements into a monolithic structure. Waveguide structure 110 can be employed in transmit (Tx) or receive (Rx) operations, and can be used to generate right-hand circular polarization (RHCP) and left-hand circular polarization (LHCP) signals when mated with a manifold polarizer, among other polarizations.

From each port, a corresponding waveguide passage leads to a central portion of the waveguide cavity which houses impedance matching element 130. Specifically, port 111 corresponds to waveguide portion 121, port 112 corresponds to waveguide portion 122, port 113 corresponds to waveguide portion 123, and port 114 corresponds to waveguide portions 124, 125, and 126 (which form a stepped transition). Additionally, port 111 has a pentagonal cross-sectional shape with portion 141 having shorter sides than the remaining sides of the pentagonal shape, forming a steeple configuration. Likewise, colinear ports 112-113 have pentagonal cross-sectional shapes with portions 142-143 having shorter sides than the remaining sides of the pentagonal shapes. Port 114 has a rectangular cross-sectional area in this example. Thus, three of the ports have pentagonal cross-sectional configurations and one of the ports has a rectangular cross-sectional configuration.

The steeple-shaped pentagonal cross-sections of ports 111-113 can provide enhanced manufacturability for certain AM techniques and manufacturing build directions (such as those noted in FIG. 1). The pentagonal cross-sections employed herein for various ports can include irregular (but bilaterally symmetric) pentagons having two longest sides generally parallel to each other, with a two additional sides of equal length and shorter than the parallel sides, and one final side spanning the same distance as the two additional sides. Thus, the pentagonal shape has a generally rectangular envelope, with three sides joined with right angles (approximately) 90° and two sides joined by acute angles (e.g., approximately) 45°. However, various cross-sectional shapes might be employed, such as rectangular, square, hex, pentagonal, circular, triangular, irregular, and others.

For magic tee waveguide structure 110, when an RF signal is fed through difference port 111, outputs of equal magnitude but opposite phase (e.g., 180 degrees out of phase) are provided at collinear ports 112-113, and the output of sum port 114 has zero power (in the ideal case). Thus, for an example transmit (Tx) operation, an RF signal provided to difference port 111 establishes a power split and phase shift over collinear ports 112-113. Colinear ports 112-113 can be further coupled to upstream/downstream RF components/elements, such as recombination arms, waveguides, filters, polarizers, hybrid couplers, orthomode transducer (OMT), aperture antenna elements, or other components. When used in recombination networks, magic tees can compensate for certain amounts of waveguide length mismatches by having an impedance load coupled to port 114 or port 111 (depending on the desired application). For example, an impedance load (not shown) coupled to either port 114 or port 111 can dissipate energy/power arising from any minor mismatches in lengths among various links or waveguide cavities of waveguide structure 110 or upstream/downstream of waveguide structure 110—when driven using the non-loaded port among port 114 or port 111. Advantageously, this automatic length compensation provides for enhanced manufacturing and assembly, as well as potentially tighter RF element spacing in arrays of RF feeds.

Figure 2:
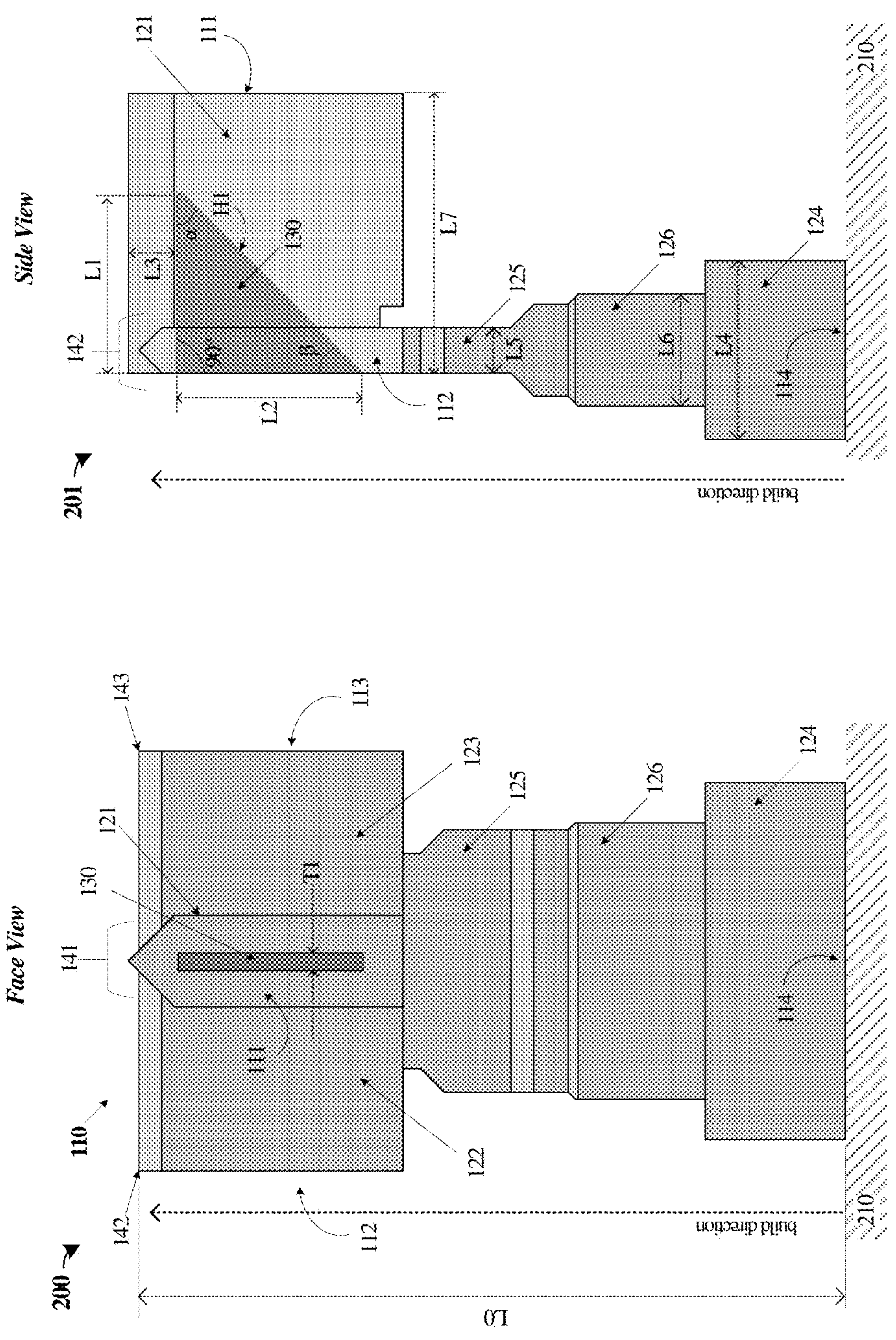
FIG. 2 illustrates a magic tee waveguide structure in an implementation.

FIG. 2 is now presented to show further views 200-201 of magic tee waveguide structure 110. Specifically, view 200 is a "face" view showing a first side of waveguide structure 110, and view 201 is a side view showing a second side of waveguide structure 110. The stepped transition features (124-126) associated with the branch of waveguide structure 110 leading to port 114 can be seen in having step-ups in both width and height to reach port 114. Moreover, impedance matching element 130 is shown having thickness T1, leg lengths L1 and L2. In this example, a face/side of impedance matching element 130 corresponding to L2 is attached to the floor or wall of the waveguide cavity along the entire length L2, while the leg/side of impedance matching element 130 corresponding to L1 is floating or unattached to any side/wall of the waveguide cavity. In this manner, two sides/faces of impedance matching element 130 (L1 and the side corresponding to hypotenuse H1) remain unattached or mechanically floating with respect to walls of the waveguide cavity forming waveguide structure 110.

To manufacture or otherwise form waveguide structure 110, an AM process or technique can be employed, as mentioned herein. In one example technique, a print bed is employed from which features and structures can be additively manufactured one layer at a time. Print bed 210 is shown in FIG. 2 which indicates a base layer from which the remaining layers of waveguide structure 110 are formed. As noted above, the representation shown in FIGS. 1 and 2 are air cavity views, which do not represent actual material forming waveguide structural walls. Instead, the walls would be formed, such as in FIG. 4, to encompass the features shown in FIGS. 1 and 2. The exception to this view configuration is impedance matching element 130 which represents the structural body forming impedance matching element 130 and is not an air cavity representation.

As waveguide structure 110 is formed using certain AM techniques, initial layers can include formation of port 114 on print bed 210 and then waveguide portions 124, 125, and 126, which form a stepped transition to a main waveguide chamber that houses impedance matching element 130. Print bed 210 can be incrementally raised for each layer formation, such as by deposition of powdered material that is selectively fused to form corresponding structures. In this manner, external overhang elements (such as for ports 111-113) can be supported by the walls or floor of the waveguide structure or the bed material itself. Impedance matching element 130 is then formed along with ports 111-113 and associated structures. Other build directions can be employed, such as when ports 111-113 are formed first and then print bed 210 is incrementally lowered to form another layer.

However, internal components lack vertical support against their own horizontal weight and bending moments during a printing or AM process, such as for conventional thin and tall cylindrical rods or posts internal to the waveguide cavity. This prohibits usage of certain AM techniques for magic tee impedance matching elements. Internal supports, such as a lattice framework, could be printed or otherwise additively manufactured along with the impedance matching element. However, this would then require extensive post-processing to remove such internal supports which may not be achievable or successful for certain internal cavities and frequency ranges. Moreover, removal of internal supports might create extremely rough surfaces which reduce RF performance of waveguide cavities (i.e., increased insertion losses, RF power losses, RF heating, multipaction concerns, unwanted reflections, and bandwidth reduction), especially where post-processing surface smoothing is not practical or externally reachable.

Advantageously, the particular structure and configuration of waveguide structure 110 and impedance matching element 130 are selected to provide enhanced manufacturability and operation when certain AM techniques are employed. For instance, impedance matching element 130 is formed having a triangular solid body. The body has a thickness T1, which can correspond to a thickness that can support the mass/weight of impedance matching element 130, or a minimum thickness provided by the AM technique if sufficient. Impedance matching element 130 also has $\alpha=45°$, $\beta=45°$, and a right (90°) triangle configuration, corresponding to a 45-45-90 isosceles right triangle. As can be seen in view 201, impedance matching element 130 has an overhang which forms hypotenuse H1. In this example, L1 and L2 are the same length, with H1 being $\sqrt{L1^2L2^2}$, although variations are possible for the individual leg lengths. This configuration of impedance matching element 130 forms a structurally robust triangle able to withstand the manufacturing process as well as produce an RF performance which makes waveguide structure 110 practical over a selected frequency range.

Variations in the $\alpha$ and $\beta$ angles (or relatedly, variations in L1/L2) can be selected according to manufacturability or performance desires. In the 45-45-90 isosceles right triangle example shown in FIGS. 1 and 2, a balance is achieved between RF performance and AM manufacturability. However, the $\beta$ angle can be selected to bias performance versus AM manufacturability and vice-versa. When the B angle selected from 0-45°, then AM manufacturability is enhanced due in part to a lesser proportion of overhang in the horizontal (L1) direction for impedance matching element 130. When the $\beta$ angle selected from 50-55°, impedance matching element 130 is more difficult to manufacture, but RF performance can be enhanced. As the $\beta$ angle approaches 90 degrees, RF performance is increased but the ability to AM manufacture impedance matching element 130 becomes nearly impractical due to impedance matching element 130 being almost entirely in the horizonal direction. Thus, a $\beta$ angle greater than 45° can increase RF performance, and less than or equal to 45° can increase AM manufacturability.

Further enhancements supported by the structure and configuration of waveguide structure 110 includes pentagonal waveguide cross-sectional ports 111-113. As with impedance matching element 130, AM manufacturing does not readily support internal shapes having horizontal overhang. Thus, an upper face of ports 111-113 is configurated to have a steeple configuration with angled peaks formed instead of a flat or horizontal side. Similar performance versus manufacturability trade-offs exist for selected overhang angles, with a 45° angle selected for this example. Also, it should be noted that impedance matching element 130 does not contact the steeple or top portion of port 111. This spacing distance can be selected to affect RF performance of waveguide structure 110. Too large of a spacing distance can have a negative impact on E-port performance (port 111), and too small of a spacing distance can have a negative impact of H-port performance (port 114). Thus, a balance is selected for performance among E-port and H-port, but variations are possible to bias performance for a particular port.

While specific dimensions are not included in FIGS. 1 and 2, example dimensions for various features are labeled, such as for L0-L8 and T1. Approximate example dimensions can be employed including L0=64 millimeters (mm), L1=16 mm, L2=16 mm, L3=4.5 mm, L4=16 mm, L5=4 mm, L6=9.5 mm, L7=25.5 mm, and T1=1.5 mm. This configuration can support an X band frequency range. Dimensions can be altered to support different frequency ranges, such as portions of the K band, among others.

FIG. 3 illustrates magic tee waveguide structure 310 in an implementation. View 300 shows a manufactured view (isometric) with internal wireframe features shown. View 301 shows a cross-sectional view along section A-A' of waveguide structure 310. Waveguide structure includes body (walls/floor) 350 which forms waveguide cavities that establish various internal waveguide features. Although a generally cubic/solid configuration is shown for body 350, other examples can have body 350 conforming to the internal waveguide features, or having various support features, flanges for ports, or other features. Moreover, body 350 can be a portion of a larger RF structure which includes other waveguide components to form an RF feed network. Thus, body 350 forms a monolithic structure formed from a single AM manufactured workpiece which avoids internal joints/interfaces. A build direction is also shown in FIG. 3 which corresponds to an incremental layering process from port 314 to ports 311-313.

Waveguide structure 310 includes four ports 311-314. Port 311 comprises a difference or E-port, port 314 comprises a sum port or H-port, and ports 312-313 comprise colinear ports. From each port, a corresponding waveguide passage leads to a central portion of the waveguide cavity which houses impedance matching element 330. Specifically, port 311 corresponds to waveguide portion 321, port 312 corresponds to waveguide portion 322, port 313 corresponds to waveguide portion 323, and port 314 corresponds to waveguide portions 324, 325, and 326 (which form a stepped transition). Additionally, port 311 has a pentagonal cross-sectional shape with a portion having shorter sides than the remaining sides of the pentagonal shape, forming a steeple configuration. Likewise, colinear ports 212-213 have pentagonal cross-sectional shapes with as-shown portions having shorter sides than the remaining sides of the pentagonal shapes. Port 314 has a rectangular cross-sectional area in this example. Thus, three of the ports have pentagonal cross-sectional configurations and one of the ports has a rectangular cross-sectional configuration. The steeple-shaped pentagonal cross-sections of ports 311-313 provide enhanced manufacturability for certain AM techniques and manufacturing build directions (such as those noted in FIG. 1). However, various cross-sectional shapes might be employed, such as rectangular, square, hex, pentagonal, circular, triangular, irregular, and others.

As can be seen in view 301, impedance matching element 330 is attached to body 350 at edge/face 351 and formed from a single material or workpiece as a monolithic construction. Materials selected for body 350 and attached impedance matching element 330 include various conductive materials, such as metals, metal alloys, aluminum, copper, nickel, magnesium, steel, or other materials, including alloys thereof. In other examples, a non-conductive or polymer material can be employed for body 350 and attached impedance matching element 330, with surface coatings, platings, or treatments used to apply a conductive layer onto RF-contacting surfaces. Thus, body 350 and impedance matching element 330 have internal/external surfaces which are conductive for RF energy propagated through corresponding waveguide cavities.

Figure 4:
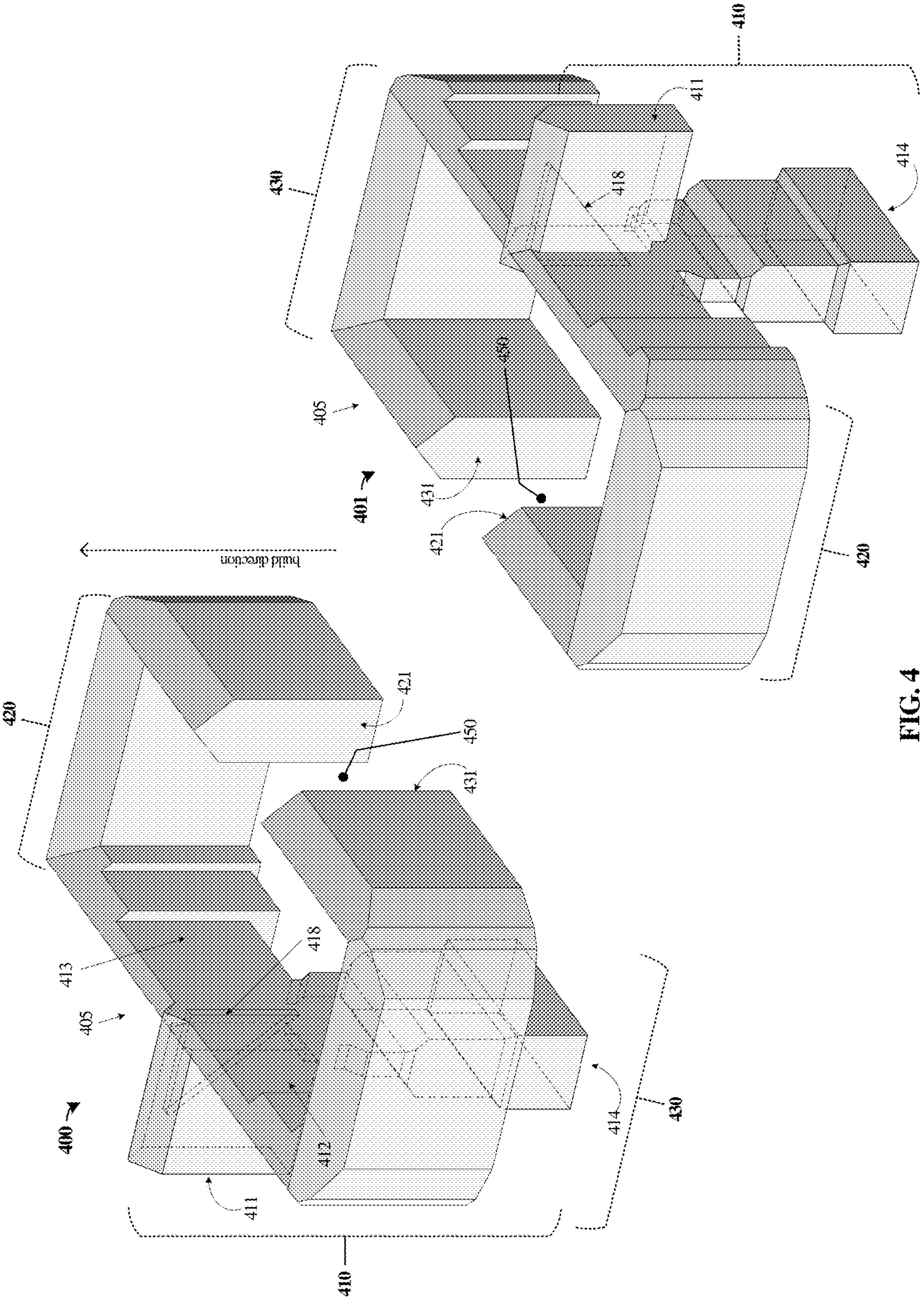
FIG. 4 illustrates a waveguide assembly in an implementation.

FIG. 4 includes views 400 and 401 which show isometric views of a waveguide air cavity for waveguide assembly 405. An air cavity view comprises the volume or space internal to a waveguide or other RF structure, such that the view shows cavities, spaces, channels, conduits, or other features through which RF energy can propagate or resonate. In contrast, manufactured views, such as seen in FIG. 3, various material is provided to form walls or structures around the air cavities, with conductive surfaces typically in contact with the air cavities. Variations on the manufactured implementation can be employed based on application, and thus the air cavity view provides an illustration of the functional or RF-active portions of a waveguide structure.

Waveguide assembly 405 includes several RF feed components which are integrated into a monolithic structure, namely magic tee 410 and recombination arms 420-430. Additional RF feed components can be included in the monolithic structure but are omitted for clarity. For example, a polarizer component or OMT component might be included in gap 450 and AM manufactured/formed into the integrated structure which then feeds an antenna aperture. Recombination arms 420 and 430 couple to colinear ports 412-413 of magic tee 410 and can be configured to excite the orthogonal TE11 modes in a downstream component, such as a polarizer, and thus can mate symmetrically between magic tee 410 and these downstream components. It should be understood that other propagation modes can be supported.

In operation, RF signals can be fed to ports of magic tee 410 which then propagate through recombination arms 420 and 430 for further propagation to downstream feed components (at gap 450) and ultimately transmission by an antenna aperture. In contrast, receive operations can have RF energy received by an antenna aperture and presented though one or more feed components to recombination arms 420 and 430 (at gap 450) for handling by magic tee 410. Further RF components can be coupled to magic tee 410, such as upstream RF feed components, RF amplifiers, filters, modulators, and various communication circuitry. For magic tee waveguide structure 410, when a Tx RF signal is fed through sum port 414, outputs of equal magnitude but opposite phase (e.g., 180 degrees out of phase) are provided at collinear ports 412-413 and recombination arms 420 and 430, and the output of difference port 411 has zero power (in the ideal case) and can be terminated by an RF load to absorb any imbalances due to manufacturing tolerances. When a Tx RF signal is fed through difference port 411, outputs of equal magnitude but opposite phase (e.g., 180 degrees out of phase) are provided at collinear ports 412-413 and recombination arms 420 and 430, and the output of sum port 414 has zero power (in the ideal case) and can be terminated by an RF load to absorb any imbalances due to manufacturing tolerances.

In further examples, magic tee 410 with integrated impedance matching element 418 provides, when difference port 412 is excited over a selected frequency range, sum port 411 receiving corresponding RF energy under a first threshold energy, typically close to zero energy (within manufacturing tolerances). Likewise, magic tee 410 with integrated impedance matching element 418 provides, when sum port 411 is excited over the selected frequency range, difference port 412 receiving corresponding RF energy under a second threshold energy, typically close to zero energy (within manufacturing tolerances).

The configuration shown in FIG. 4 integrates a magic tee into further RF feed structures as a monolithic and fully 3D printed feed network. Furthermore, magic tee 410 includes triangular impedance matching element 418 which provides impedance matching among ports 411 and 412, as well as enhanced manufacturability for 3D printing techniques. Advantageously, waveguide assembly 405 provides for reductions in cost, time to manufacture, mass, and supports manufacturing using various AM techniques that are unsuitable for conventional magic tec designs.

Figure 5:
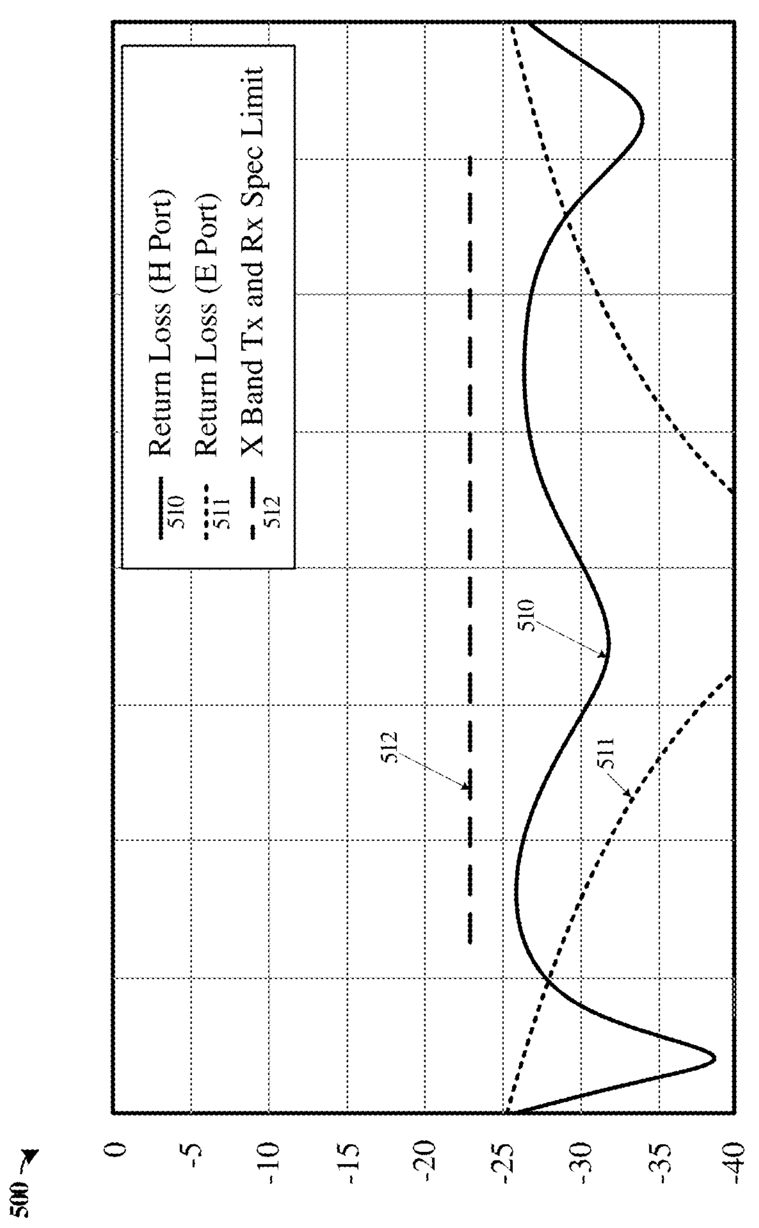
FIG. 5 illustrates performance characteristics of a waveguide structure in an implementation.

FIG. 5 illustrates performance characteristics of a waveguide structure in an implementation, such as waveguide structure 110, 310, or 410. FIG. 5 includes graph 500 which includes performance characteristics of an example magic tee waveguide structure over a frequency range of 7-8.6 GHz. Insertion loss in decibels (dB) is represented on the vertical axis of graph 500, with frequency represented by the horizontal axis. Also, graph 500 includes specification limit 512 which is a desired performance characteristic for X band Tx and Rx insertion loss.

Curve 510 shows example H-port insertion loss performance in dB over a selected frequency range. Curve 511 shows example E-port insertion loss performance in dB for the selected frequency range. As can be seen, both H-port and E-port performance exceeds the specification limit, and in fact are below −25 dB insertion loss over the selected frequency range. This example shows that X band performance over 20% bandwidth can be achieved for an additively manufactured magic tee waveguide structure. Moreover, bandwidth commonality among an E-port and H-port of a magic tee establishes desired return loss performance, with the triangular impedance matching element providing such performance while being manufacturable using AM techniques.

Thus, the examples discussed herein provide an RF waveguide cavity coupling colinear ports, a difference port, and a sum port, which typically forms a magic tee arrangement. This arrangement has the sum port disposed perpendicularly to both the difference port and the colinear ports. An impendence matching element comprising a triangular body is disposed in the waveguide cavity and this triangular body protrudes perpendicularly from a wall of the waveguide cavity between the colinear ports. The impendence matching element can comprise an isosceles right triangular body having a selected thickness and a hypotenuse face positioned toward the difference port and the sum port. In some examples, the isosceles right triangular body comprises leg faces positioned along longitudinal axes corresponding to the difference port and the sum port and the hypotenuse face subtending a right angle between the legs. In further examples, a first leg face is attached to the wall of the waveguide cavity between the colinear ports and a second leg face and the hypotenuse face are detached from any wall of the waveguide cavity. The colinear ports and the difference port each can comprise pentagonal cross-sectional configurations establishing steeples having two adjacent sides shorter than remaining sides of the pentagonal shape. The sum port can comprise a rectangular cross-sectional configuration. The main waveguide cavity can also have a stepped increase in cross-sectional area to the sum port, which may couple to further external components, waveguides, and other elements via standardized waveguide flanges or can employ fasteners, welds, clamps, and the like. Advantageously, the examples herein can provide a monolithic AM-manufactured magic tee configuration comprising an impendence matching element disposed within the waveguide cavity defined by waveguide walls housing the colinear ports, the difference port, and the sum port.

The frequency ranges for RF waveguides, components, configurations, systems, and arrangements herein include various RF bands, such as microwave frequencies capable of transiting RF waveguide structures. Different frequency bands can be supported by similar architectures as shown herein, with associated geometry scaling to suit the selected frequency ranges. While the examples herein cover portions of the RF bands noted above, examples might include the X band (approximately 8 to 12 GHZ), or the Ka band and Ku band or other portions of the K bands (approximately 12 to 40 GHZ). Other examples might be configured to support frequency ranges, or portions thereof, corresponding to the IEEE bands of S band, L band, C band, X band, Ku band, K band, Ka band, V band, W band, among others, including combinations thereof. Other example RF frequency ranges and service types include ultra-high frequency (UHF), super high frequency (SHF), extremely high frequency (EHF), or other parameters defined by different organizations. In addition, various frequency bands associated with communication technology, such as Wi-Fi and 4G/5G cellular communications can be employed. These include the IEEE 802.11 family of frequency bands (Wi-Fi), and the 4G/5G broadband cellular network frequency bands including the low band (600 to 700 MHZ), mid band (1.7 GHZ to 2.5 GHz), high band (24 to 100 GHz (mmWave)) defined by the 3rd Generation Partnership Project (3GPP) and other organizations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A waveguide structure, comprising:

a waveguide cavity coupling colinear ports, a difference port, and a sum port, with the sum port disposed perpendicularly to both the difference port and the colinear ports; and an impendence matching element comprising a right triangular body having a hypotenuse face positioned toward the difference port and the sum port, disposed in the waveguide cavity, and protruding perpendicularly from a wall of the waveguide cavity between the colinear ports.

2. The waveguide structure of claim 1, wherein the impendence matching element comprises an isosceles right triangular body having a selected thickness.

3. The waveguide structure of claim 1, wherein the right triangular body comprises leg faces positioned along longitudinal axes corresponding to the difference port and the sum port and the hypotenuse face subtending a right angle between the legs.

4. The waveguide structure of claim 3, wherein a first leg face is attached to the wall of the waveguide cavity between the colinear ports and a second leg face and the hypotenuse face are detached from any wall of the waveguide cavity.

5. The waveguide structure of claim 1, wherein the impendence matching element comprises conductive exterior faces.

6. The waveguide structure of claim 1, wherein the colinear ports and the difference port each comprise pentagonal cross-sectional configurations establishing steeples having two sides shorter than remaining sides.

7. The waveguide structure of claim 6, wherein the sum port comprises a rectangular cross-sectional configuration, and comprising:

the waveguide cavity establishing a stepped increase in cross-sectional area to the sum port.

8. The waveguide structure of claim 1, wherein the impendence matching element is configured to establish a matched impedance configuration for ports of the waveguide structure such that excitation of either the difference port or the sum port is supported.

9. The waveguide structure of claim 8, wherein the impedance matching configuration provides, when the difference port is excited over a selected frequency range, the sum port receives corresponding radio frequency energy under a first threshold; and wherein the impedance matching configuration provides, when the sum port is excited over the selected frequency range, the difference port receives corresponding radio frequency energy under a second threshold.

10. The waveguide structure of claim 1, comprising a magic tee waveguide structure having at least a 20 percent bandwidth over a selected frequency range and less than 25 dB return loss for excitation of either the difference port or the sum port.

11. The waveguide structure of claim 1, comprising:

a monolithic configuration comprising the impendence matching element disposed within the waveguide cavity defined by waveguide walls housing the colinear ports, the difference port, and the sum port.

12. The waveguide structure of claim 11, comprising:

recombination arms coupled to the colinear ports and established in the monolithic configuration.

13. The waveguide structure of claim 11, comprising:

load termination applied to a selected one among the sum port and the difference port.

14. The waveguide structure of claim 1 formed using an additive manufacturing process with a manufacturing direction upward from the sum port to the colinear ports and difference ports.

15. A method, comprising:

forming a waveguide structure by at least:

forming a waveguide cavity coupling colinear ports, a difference port, and a sum port, with the sum port positioned perpendicularly to both the difference port and the colinear ports; and forming an impendence matching element comprising a right triangular body having a hypotenuse face positioned toward the difference port and the sum port, disposed in the waveguide cavity, and protruding perpendicularly from a wall of the waveguide cavity between the colinear ports.

16. The method of claim 15, wherein the impendence matching element comprises an isosceles right triangular body having a selected thickness;

wherein leg faces are positioned along longitudinal axes corresponding to the difference port and the sum port, with the hypotenuse face subtending a right angle between the legs; and wherein a first leg face is attached to the wall of the waveguide cavity between the colinear ports, and a second leg face and the hypotenuse face are detached from any wall of the waveguide cavity.

17. The method of claim 15, wherein the colinear ports and the difference port each comprise pentagonal cross-sectional configurations establishing steeples having two sides shorter than remaining sides; and wherein the sum port comprises a rectangular cross-sectional configuration.

18. The method of claim 17, wherein the waveguide cavity forms a stepped increase in cross-sectional area to the sum port.

19. The method of claim 15, comprising:

forming the waveguide structure as a monolithic structure with an additive manufacturing technique such that a manufacturing direction is established upward from the sum port to the colinear ports and difference ports.

20. The method of claim 19, comprising:

forming recombination arms coupled to the colinear ports and incorporated into the monolithic configuration.

* * * * *